United States Patent
Ichikawa et al.

(10) Patent No.: US 6,746,748 B2
(45) Date of Patent: Jun. 8, 2004

(54) HONEYCOMB STRUCTURE AND PROCESS FOR PRODUCTION THEREOF

(75) Inventors: Shuichi Ichikawa, Handa (JP); Takahiro Tomita, Ogaki (JP); Shinji Kawasaki, Nagoya (JP); Hiroaki Sakai, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 10/203,518

(22) PCT Filed: Nov. 12, 2001

(86) PCT No.: PCT/JP01/09857
§ 371 (c)(1), (2), (4) Date: Aug. 12, 2002

(87) PCT Pub. No.: WO02/40424
PCT Pub. Date: May 23, 2002

(65) Prior Publication Data
US 2003/0021948 A1 Jan. 30, 2003

(30) Foreign Application Priority Data
Nov. 17, 2000 (JP) .......................................... 2000-350847

(51) Int. Cl.⁷ ................................................. B32B 3/12
(52) U.S. Cl. ..................... 428/116; 428/34.4; 428/188; 428/402; 428/446; 428/698; 428/699; 264/43; 264/44; 264/630; 264/656; 264/660; 264/661; 501/80; 501/81; 501/87; 501/88; 501/154
(58) Field of Search ................................ 428/116, 117, 428/118, 34.4, 174, 178, 188, 402, 446, 688, 698, 699; 264/42, 43, 44, 624, 630, 628, 653, 656, 660, 661, 682; 501/80, 81, 87, 88, 154

(56) References Cited

U.S. PATENT DOCUMENTS

| 6,231,791 B1 | * | 5/2001 | Heine et al. |
| 2002/0016248 A1 | * | 2/2002 | Ohji et al. |
| 2003/0057581 A1 | * | 3/2003 | Lu et al. |

FOREIGN PATENT DOCUMENTS

| JP | 63-8264 | 1/1988 |
| JP | 5-17227 | 1/1993 |

OTHER PUBLICATIONS

Machine Translation JP 05–017227.*

* cited by examiner

Primary Examiner—Deborah Jones
Assistant Examiner—Wendy Boss
(74) Attorney, Agent, or Firm—Parkhurst & Wendel, L.L.P.

(57) ABSTRACT

A honeycomb structure made of a silicon carbide-based porous body and having a number of through-holes extending in the axial direction, separated by partition walls. The strength and Young's modulus of the silicon carbide-based porous body satisfy the following relation:

Strength (MPa)/Young's modulus (GPa)$\geq 1.1$.

The honeycomb structure contains refractory particles such as silicon carbide particles and the like and yet can be produced at a relatively low firing temperature at a low cost, has a high strength and a high thermal shock resistance, and can be suitably used, for example, as a filter for purification of automobile exhaust gas by a treatment such as plugging of through-channel at its inlet or outlet, or as a catalyst carrier, even under a high SV condition.

5 Claims, 1 Drawing Sheet

HONEYCOMB STRUCTURE AND PROCESS FOR PRODUCTION THEREOF

TECHNICAL FIELD

The present invention relates to a honeycomb structure used in a filter for purification of automobile exhaust gas, a catalyst carrier, or the like, as well as to a process for production of such a honeycomb structure.

BACKGROUND ART

Porous honeycomb structures are in wide use as a filter for capturing and removing the particulate substance present in a dust-containing fluid (e.g. exhaust gas emitted from diesel engine), or as a catalyst carrier for loading thereon a catalyst component capable of purifying the harmful substances present in an exhaust gas. It is known that as a material constituting such a honeycomb structure, there are used refractory particles such as silicon carbide (SiC) particles and the like.

As a specific technique related thereto, there is disclosed, in, for example, JP-A-6-182228, a porous, silicon carbide-based catalyst carrier of honeycomb structure, obtained by using, as a starting material, a silicon carbide powder having a given specific surface area and a given impurity content, molding the material into a desired shape, drying the molded material, and firing the resulting material at a temperature of 1,600 to 2,200° C.

Meanwhile, there are disclosed, in JP-A-61-26550, a process for producing a vitrifying material-containing refractory product, which comprises adding a vitrifying material to an easily oxidizable material or a refractory composition containing an easily oxidizable material, mixing, kneading and molding them together with a binder, and open-firing the molded material in a furnace containing a non-oxidative atmosphere; and, in JP-A-8-165171, a silicon carbide molded material obtained by adding, to a silicon carbide powder, an organic binder and inorganic binders of clay mineral series, glass series and lithium silicate series and molding the resulting material.

Also, in JP-A-6-182228 is introduced a process for producing a conventional porous, silicon carbide-based sintered body, which comprises adding, to silicon carbide particles as an aggregate, a binder such as vitreous flux, clayey material or the like, molding them, and firing the molded material at a temperature at which the binder melts.

Further, as to a high-temperature use ceramic filter produced by molding refractory particles which consist of silica sand, a ground pottery, a metal oxide (e.g. $Al_2O_3$, $TiO_2$, or $ZrO_2$), silicon carbide, nitride, boride, other refractory material, or the like and which are adjusted to a given grain size, to a porous, bottomed cylindrical material using a refractory binder such as water glass, frit, glaze or the like, there are disclosed, in JP-B-61-13845 and JP-B-61-13846, the preferred average particle diameter and particle size distribution of refractory particles, the preferred porosity, average pore diameter, pore volume and partition wall thickness of cylindrical material, etc.

In the sintering (necking between particles) caused by the recrystallization of silicon carbide powder per se, shown in JP-A-6-182228, the silicon carbide component vaporizes from the surfaces of silicon carbide particles and the vaporized silicon carbide component condenses at the contact areas (necks) between silicon carbide particles; as a result, the necks grow and the particles are bonded to each other.

There are problems, however, that this method brings a high cost since a very high firing temperature is required to be employed in order to vaporize silicon carbide, and that the yield after firing is reduced since a material of high thermal expansion coefficient is required to be fired at a high temperature as well.

The above process allows production of a porous body of high strength; however, the porous body has a high Young's modulus which is derived from the physical properties possessed by the silicon carbide used as a raw material.

In general, coefficient (R) of thermal shock resistance is shown by the following formula (1). In the following formula, S is a fracture strength, ν is a Poisson ration, E is a Young's modulus, and α is a thermal expansion coefficient. ν and α are characteristic values of each material and are almost constant in each material; meanwhile, S and E vary greatly depending upon the porosity, fine structure, etc. of each material.

$$R = S(1-\nu)/E\alpha \tag{1}$$

As shown in the above formula, thermal shock resistance is directly proportional to strength but inversely proportional to Young's modulus. Therefore, according to the process for producing a sintered body disclosed in JP-A-6-182228, a sintered body having a sufficient thermal shock resistance, while it has a high strength though, can not be produced since Young's modulus becomes high.

Meanwhile, there is a problem that a localized heat generation is caused by the low thermal conductivity of the filter in the case of the technique of bonding a silicon carbide powder (as a raw material) with a vitreous material, shown in JP-A-61-26550 and JP-A-6-182228 wherein a low firing temperature of 1,000 to 1,400° C. is employed; if one tries to burn the particulates collected by and deposited on the filter for reactivation of the filter, in the case that the sintered body produced by the technique is used, for example, as a diesel particulate filter (DPF) for removing the particulates contained in the exhaust gas emitted from a diesel engine.

Further, the filter shown in JP-B-61-13845 and JP-B-61-13846 is porous but is a bottomed cylindrical material having a large partition wall thickness of 5 to 20 mm; therefore, there is a problem that the filter is not usable under the high space velocity (SV) condition like a filter for purification of automobile exhaust gas.

The present invention has been made in view of the above-mentioned situation of the prior art, and is intended to provide a honeycomb structure which contains refractory particles such as silicon carbide particles and the like and yet can be produced at a relatively low firing temperature at a low cost, which has a high strength and a high thermal shock resistance, and which can be suitably used, for example, as a filter for purification of automobile exhaust gas by a treatment such as clogging of through-channel at its inlet or outlet, or as a catalyst carrier, even under a high SV condition; and a process for producing such a honeycomb structure.

DISCLOSURE OF THE INVENTION

According to the present invention there is provided a honeycomb structure made of a silicon carbide-based porous body and having a plural number of through-channels extending in the axial direction, separated by partition walls, characterized in that the strength and Young's modulus of the silicon carbide-based porous body satisfy the following relation:

Strength (MPa)/Young's modulus (GPa)≧1.1.

In the present invention, the strength and Young's modulus of the silicon carbide-based porous body preferably satisfy the following relation:

Strength (MPa)/Young's modulus (GPa)≧1.25.

Further in the present invention, the strength and Young's modulus of the silicon carbide-based porous body preferably satisfy the following relation. In the present invention, the silicon carbide-based porous body preferably contains silicon carbide particles as aggregate and metallic silicon as a binder:

Strength (MPa)/Young's modulus (GPa)≧1.3.

According to the present invention, there is also provided a process for producing a honeycomb structure, which comprises adding metallic silicon and an organic binder to raw material silicon carbide particles, mixing and kneading them to obtain a readily formable puddle, molding the readily formable puddle into a honeycomb-shaped molded material, calcinating the molded material to remove the organic binder in the molded material, and firing the resulting material, characterized in that the addition amount of the metallic silicon is 15 to 40% by weight based on the total amount of the raw material silicon carbide particles and the metallic silicon.

In the present invention, the firing is preferably conducted in a temperature range of 1,400 to 1,600° C.

BEST MODE FOR CARRYING OUT THE INVENTION

Figure 1:
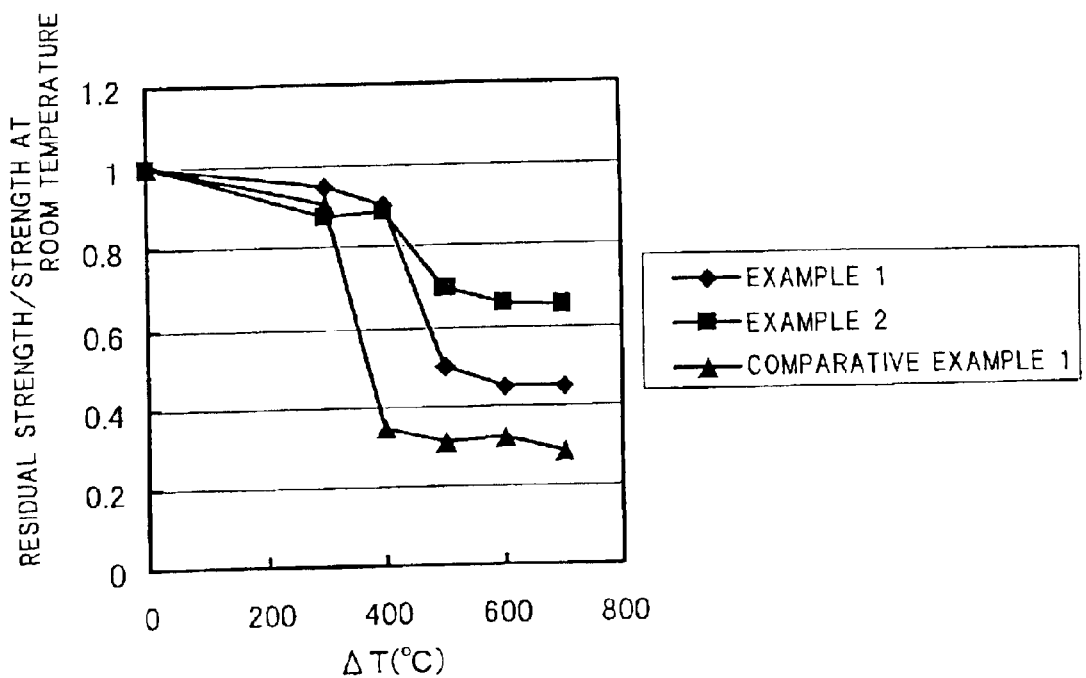
FIG. 1 is a graph obtained by plotting residual strength and strength at room temperature against a temperature difference ΔT (°C.) between electric furnace and water.

The honeycomb structure of the present invention is constituted by a silicon carbide-based porous body, and the silicon carbide-based porous body is produced so as to have a strength and a Young's modulus satisfying the following relation.

Strength (MPa)/Young's modulus (GPa)≧1.1

As mentioned previously, thermal shock resistance is inversely proportional to Young's modulus; therefore, to reduce Young's modulus relative to strength is important in order to obtain a honeycomb structure of high thermal shock resistance. When the above value is less than 1.1, the resulting honeycomb structure is low in thermal shock resistance and, when such a honeycomb structure is used, for example, as a diesel particular filter (DPF) for removing the particulates contained in an exhaust gas emitted from a diesel engine and when the particulates collected by and deposited on the filter are burned for reactivation of the filter, a sharp temperature difference appears in the filter and may break the filter; therefore, such a value is not preferred. In the honeycomb structure of the present invention, the ratio of strength and Young's modulus, of the silicon carbide-based porous body constituting the honeycomb structure is set so as to satisfy the above formula; therefore, the present honeycomb structure shows an excellent thermal shock resistance.

It is preferred to set the ratio of strength and Young's modulus, of the silicon carbide-based porous body so as to satisfy the following formula, because a better thermal shock resistance is obtained.

Strength (MPa)/Young's modulus (GPa)≧1.25

It is particularly preferred to set the ratio of strength and Young's modulus, of the silicon carbide-based porous body so as to satisfy the following formula, because a sufficient thermal shock resistance is obtained.

Strength (MPa)/Young's modulus (GPa)≧1.3

When the strength and Young's modulus of the silicon carbide-based porous body are set so as to roughly satisfy the following relation, the honeycomb structure made of such a silicon carbide-based porous body may be used with no problem in, for example, DPF.

Strength (MPa)/Young's modulus (GPa)≦4.0

In the above formula, a value exceeding 4.0 is desirable from the standpoint of thermal shock resistance; however, since it means a low Young's modulus, the honeycomb structure constituted by such a silicon carbide-based porous body may have strain therein and the strain gradually grows in the long-term use of the honeycomb structure and may incur the fracture thereof. Therefore, such a value is not preferred.

The silicon carbide-based porous body constituting the honeycomb structure of the present invention, preferably contains silicon carbide particles as aggregate and metallic silicon as a binder for bonding between silicon carbide particles. Thereby, in its production, a relatively low sintering temperature can be used for sintering, and a honeycomb structure having an excellent thermal shock resistance can be obtained without conducting firing at a very high temperature such as shown in JP-A-6-182227. As a result, the production cost can be kept low and the yield can be made high.

The honeycomb structure of the present invention uses metallic silicon for bonding between silicon carbide particles and accordingly has a high thermal conductivity as compared with conventional structures using a vitreous material for bonding between refractory particles; therefore, when it is used, for example, as a DPF and when the particulates deposited on the filter are burned for reactivation of the filter, there appears no local heat generation such as to damage the filter. Further, the honeycomb structure of the present invention is not a bottomed cylindrical material of large wall thickness such as shown in JP-B-61-13845 or JP-B-61-13846, but a porous honeycomb structure; therefore, it can be used under a high SV condition, for example, as a filter for purification of automobile exhaust gas or as a catalyst carrier.

Next, description is made on the process for producing the honeycomb structure of the present invention. In producing the honeycomb structure of the present invention, first, metallic silicon and an organic binder are added to raw material refractory particles, and they are mixed and kneaded according to an ordinary method to obtain a readily formable puddle.

As the refractory particles used in the present invention, there are used silicon carbide particles in view of the thermal resistance, etc. in considering that the honeycomb structure to be produced is used in, for example, a DPF which is often exposed to high temperatures when the particulates deposited on the DPF are burned. As other refractory particles used preferably, there can be mentioned oxides such as $Al_2O_3$, $ZrO_2$, $Y_2O_3$ and the like; carbides such as SiC and the like; nitrides such as $Si_3N_4$, AlN and the like; mullite; and so forth. Raw materials for refractory particles (e.g. silicon carbide) and metallic silicon contain small amounts of impurities such as Fe, Al, Ca and the like in some cases; however, they may be used per se or after purification by chemical treatment such as chemical washing or the like.

In order to obtain a silicon carbide-based porous body having a preferred strength-to-Young's modulus ratio such as mentioned above, there can be mentioned a method of using, as a binder, a material of small Young's modulus such as metal or the like. In particular, metallic silicon used in the honeycomb structure and production process thereof, of the present invention is an excellent binder in view of the thermal resistance, corrosion resistance, handleability, etc. However, since the strength-to-Young's modulus ratio mentioned above has a close correlation with the fine structure of the silicon carbide-based porous body obtained, use of metallic silicon alone is not sufficient and it is necessary to optimize the microstructures of the silicon carbide-based porous body which is determined by the particle diameters and compositions of the raw materials used, the firing temperature employed, etc.

The metallic silicon melts during firing and wets the surfaces of the silicon carbide particles and acts so as to bond the particles with each other. In the present process for producing a honeycomb structure, the appropriate addition amount of metallic silicon varies depending upon the particle diameters and shape of silicon carbide particles, but needs to be 13 to 35% by weight and is preferably 15 to 35% by weight, more preferably 18 to 32% by weight based on the total amount of silicon carbide particles and metallic silicon.

An addition amount of metallic silicon of less than 15% by weight is not preferred because the low Young's modulus brought about by the use of metallic silicon does not appear sufficiently. An addition amount of more than 40% by weight is not preferred, either, because the resulting honeycomb structure has a dense structure and gives a high Young's modulus.

The readily formable puddle obtained is molded into a desired honeycomb shape by extrusion or the like. Then, the resulting molded material is calcinated (degreased) to remove the organic binder contained therein, followed by firing. The calcination is preferably conducted at temperatures lower than the temperature at which the metallic silicon melts. Specifically, the molded material may be calcinated by once keeping at a predetermined temperature of about 150 to 700° C., or may be calcinated by using a small temperature elevation rate of 50° C./hr or less in a predetermined temperature range.

When the calcination is conducted by once keeping the molded material at a predetermined temperature, the predetermined temperature may be one temperature level or may be a plurality of temperature levels depending upon the kind and amount of the organic binder used; when the molded material is kept at a plurality of temperature levels, the times of keeping at these temperature levels may be the same or different. When the calcination is conducted by using a small temperature elevation rate, the small temperature elevation rate may be used only in one temperature range or in a plurality of temperature ranges; when the small temperature elevate rate is used in a plurality of temperature ranges, the temperature elevation rates in these temperature ranges may be the same or different.

The atmosphere used in the calcination may be an oxidizing atmosphere. However, when the organic binder is contained in the molded material in a large amount, the organic binder may be burned violently by the action of oxygen during the calcination to incur the quick temperature increase of the molded material; therefore, the calcination is preferably conducted in an inert atmosphere such as $N_2$, Ar or the like in order to prevent the abnormal temperature increase of the molded material. The prevention of the abnormal temperature increase is important when a raw material of large thermal expansion coefficient (low thermal shock resistance) is used. When the organic binder is used in an amount of 20% by weight or more based on the main raw material (as a superaddition), the calcination is preferred to be conducted in the above-mentioned inert atmosphere. Also when the refractory particles are SiC particles or those which may be oxidized at high temperatures, it is preferred that the calcination is conducted in the inert atmosphere at least at a temperature at which the oxidation begins and at higher temperatures to prevent the oxidation of the molded material.

The calcination and the subsequent firing may be conducted in different steps in one furnace or different furnaces. Or, they may be conducted in a continuous step in one furnace. The former operation is preferred when the calcination and the firing are carried out in different atmospheres; however, the latter operation is preferred from the standpoints of total time of calcination and firing, furnace operating cost, etc.

In order to obtain a structure in which the refractory particles are bonded by the metallic silicon, the metallic silicon must soften. In the present process for producing a honeycomb structure, the temperature range of the firing is preferably 1,400 to 1,600° C. The optimum firing temperature is determined from the fine structure and properties required for the honeycomb structure produced; however, the firing temperature is more preferably 1,450 to 1,600° C., further preferably 1,450 to 1,550° C.

A firing temperature of lower than 1,400° C. is not preferred because the temperature is lower than the melting point (1,410° C.) of metallic silicon and no porous structure is obtainable. A firing temperature of higher than 1,600° C. is not preferred, either, because no sufficient reduction in Young's modulus owing to use of metallic silicon is obtainable.

Incidentally, the production process employing recrystallization, shown in the above-mentioned JP-A-6-182228 enables bonding between silicon carbide particles and produces a sintered body of high thermal conductivity; however, since sintering is allowed to take place by vaporization and condensation, as mentioned previously, and silicon carbide is vaporized, a firing temperature higher than that used in the present production process is needed and firing at 1,800° C. or mores ordinarily at 2,000° C. or more is necessary in order to obtain a silicon carbide sintered body which is usable practically.

The atmosphere used in the firing is preferably selected depending upon the kind of the refractory particles used. In the present invention, since silicon carbide particles are used as the refractory particles, oxidation there of at high temperatures is feared. Therefore, it is preferred to use a non-oxidizing atmosphere such as $N_2$, Ar or the like at least at a temperature at which oxidation begins and at higher temperatures.

The present invention is described in more detail below by way of Examples. However, the present invention is in no way restricted to these Examples.

(EXAMPLES 1 AND 2)

A raw material SiC powder having an average particle diameter shown in Table 1 and a metallic Si powder having an average particle diameter of 4 μm were compounded so as to give a composition shown in Table 1. To 100 parts by weight of the resulting powder were added 6 parts by weight of methyl cellulose as an organic binder, 2.5 parts by weight of a surfactant and 24 parts by weight of water, followed by uniform mixing and kneading to obtain a readily formable puddle. The readily formable puddle was molded, using an extruder, into a honeycomb shape having an outer diameter of 45 mm, a length of 120 mm, a partition wall thickness of 0.43 mm and a cell density of 100 cells/in$^2$ (16 cells/cm$^2$). The honeycomb molded material was calcinated for degreasing, in an oxidizing atmosphere at 550° C. for 3 hours and then fired in a non-oxidizing atmosphere at a temperature shown in Table 1 for 2 hours, to produce silicon carbide porous sintered bodies of honeycomb structure (Examples 1 and 2). Test pieces were cut out from the sintered bodies, and measured for average pore diameter and porosity using a mercury porosimeter. Further, using a material tester, the test pieces were further measured for strength according to four-point bending strength test, and measured and calculated for Young's modulus (from the relation between load and displacement) according to static elastic modulus test method; and the results obtained are shown in Table 1. Furthermore, the crystal phase was identified by X-ray diffraction, which confirmed that they were composed of SiC and Si.

COMPARATIVE EXAMPLE 1

A silicon carbide porous sintered body of honeycomb structure was produced in the same procedure as in Examples 1 and 2 except that no metallic Si powder as a raw material was used, and under the recrystallization conditions shown in Table 1 (Comparative Example 1). The sintered body was measured and calculated for properties in the same procedure as in Examples 1 and 2, and the results obtained are shown in Table 1. Further, the crystal phase was identified by X-ray diffraction, which confirmed that it was composed of SiC alone.

In Comparative Example 1, the strength begins to decrease when the temperature difference ΔT reaches 300° C.; in contrast, in each of Examples 1 and 2, the strength begins to decrease when the temperature difference ΔT reaches 400° C. Thus, the excellent thermal-shock resistance of the present invention could be confirmed. Further, when Example 1 is compared with Example 2, Example 2 shows a smaller reduction in strength than Example 1 and was superior in thermal shock resistance.

INDUSTRIAL APPLICABILITY

As described above, in the honeycomb structure of the present invention, the strength and Young's modulus of the silicon carbide-based porous body constituting the honeycomb structure are set so as to have a particular ratio; therefore, the present honeycomb structure has an excellent thermal shock resistance as compared with honeycomb structures produced by conventional recrystallization. Further, the present honeycomb structure contains silicon carbide particles as refractory particles and yet can be produced at a relatively low firing (sintering) temperature; therefore, it can be produced at a low cost, shows a high yield, and can be provided inexpensively. Furthermore, the present honeycomb structure has not only an excellent thermal shock resistance but also a high thermal conductivity; therefore, when used, for example, as a DPF and when the particulates deposited thereon are burned for filter reactivation, there occurs no local heat generation such as to damage the filter. Moreover, being porous, the present honeycomb structure can be suitably used, for example, as a filter for purification of automobile exhaust gas or a catalyst carrier, even under a high SV condition.

What is claimed is:

1. A honeycomb structure made of a silicon carbide-based porous body, said silicon carbide-based porous body containing silicon carbide as aggregates in an amount of 85 to

TABLE 1

|  | Process | SiC particle diameter (μm) | Si/SiC ratio (wt. %) | Firing Temperature (° C.) | Average pore diameter (μm) | Porosity (%) | Strength (MPa) | Young's modulus (GPa) | Strength (MPa)/ Young's modulus (GPa) ratio |
|---|---|---|---|---|---|---|---|---|---|
| Example 1 | Bonding by Metallic silicon | 30 | 20/80 | 1450 | 10 | 45 | 20 | 17 | 1.17 |
| Example 2 | Bonding by Metallic silicon | 30 | 30/70 | 1450 | 10 | 45 | 20 | 15 | 1.33 |
| Comparative Example 1 | Sintering by recrystallization Reaction | 15 | 0/100 | 2300 | 10 | 45 | 40 | 38 | 1.05 |

(Thermal shock resistance test (in-water rapid cooling test))

Samples (test pieces cut out from the sintered bodies of Examples 1 and 2 and Comparative Example 1) were placed in an electric furnace of predetermined temperature and then put into water of room temperature for rapid cooling. Thereafter, the samples were measured for strength according to four-point bending strength test.

The strength of sample before heating in electric furnace was taken as "strength at room temperature", and the strength of sample after rapid cooling was taken as "residual strength"; residual strength/strength at room temperature was plotted against temperature difference ΔT (° C.) between electric furnace and water, and the resulting graph is shown in FIG. 1.

60% by weight and metallic silicon as a binder in an amount of 15 to 40% by weight, and having a plural number of through-channels extending in the axial direction, separated by partition walls, characterized in that strength and Young's modulus of silicon carbide-based porous body satisfy the following relation:

Strength (MPa)/Young's modulus (GPa)≧1.1.

2. A honeycomb structure according to claim 1, wherein the strength and Young's modulus of the silicon carbide-based porous body satisfy the following relation:

Strength (MPa)/Young's modulus (GPa)≧1.25.

3. A honeycomb structure according to claim 1, wherein the strength and Young's modulus of the silicon carbide-based porous body satisfy the following relation:

Strength (MPa)/Young's modulus (GPa)≧1.3.

4. A process for producing a honeycomb structure, which comprises adding metallic silicon and an organic binder to raw material silicon carbide particles, mixing and kneading them to obtain a readily formable puddle, extruding the readily formable puddle into a honeycomb-shaped molded material, calcinating the molded material to remove the organic binder in the molded material, and firing the resulting material, characterized in that the addition amount of the metallic silicon is 15 to 40% by weight based on the total amount of the raw material silicon carbide particles and the metallic silicon.

5. A process for producing a honeycomb structure according to claim 4, wherein the firing is conducted in a temperature range of 1,400 to 1,600° C.

* * * * *